3,630,942
REMOVAL OF ORGANIC IODINE FROM RADIO-IODINE-CONTAINING ATMOSPHERES

Benadetto A. Soldano and Wilfred T. Ward, Oak Ridge, Tenn., assignors to the United States of America as represented by the United States Atomic Energy Commission
No Drawing. Filed Feb. 17, 1969, Ser. No. 799,905
Int. Cl. B01d 47/06
U.S. Cl. 252—188        2 Claims

ABSTRACT OF THE DISCLOSURE

A spray or scrub solution for removing iodine from gases in contact therewith comprises:
(a) An aqueous solution adjusted to a pH in the range 9 to 10 with an alkali metal hydroxide such as potassium hydroxide or sodium hydroxide, said solution containing
(b) Up to .3 weight percent boron as borate,
(c) A reducing agent for molecular or atomic iodine selected from the group consisting of sodium thiosulfate and formaldehyde, and
(d) From 0 to an effective amount of a free radical getter, or a material which reacts with hydrated electrons.

BACKGROUND OF THE INVENTION

The invention described herein was made in the course of, or under, a contract with the United States Atomic Energy Commission.

This invention relates to the removal of iodine from air-borne atmospheres. More particularly, it relates to a solution which can effectively remove molecular iodine as well as organic iodine compounds from gaseous atmospheres.

Iodine-131 is a gaseous nuclear fission by-product found in effluent gases associated with the atmosphere in a reactor containment system, particularly from fuel rupture or fuel melt-down incidents. It is also found in the effluent gases associated with the processing of spent nuclear fuels.

The iodine generated under such conditions takes on two principal forms, as molecular iodide, hydrogen iodine, and a small but radiologically significant fraction consisting of low-molecular-weight alkyl iodides, principally methyl iodide. It is known that radioactive elemental or molecular iodine, when taken into the body, concentrates in the thyroid gland. Subsequent studies have also shown that low-molecular-weight iodides, particularly methyl iodide, behave in the same way as elemental iodine in the human body. It is therefore imperative from a radiological health standpoint to control the concentration of iodine, in any form, present in gaseous effluents of the type described.

A considerable body of technology exists for removing molecular iodine from air-borne atmospheres by special aqueous basic solutions useable as a spray or as a caustic scrubbing solution. Of the many solutions proposed for iodine clean-up, two are presently of greatest interest. They are a basic borate solution adjusted to a pH of about 9 by addition of sodium hydroxide containing 3000 parts per million boron as borate and a basic thiosulfate solution containing about 1 weight percent sodium thiosulfate adjusted to the same pH and containing about the same amount of boron. As a spray, such solutions must effectively scavenge iodine under a wide variety of conditions normally associated with the design conditions of an operating reactor. In a typical reactor excursion requiring radioactive iodine clean-up, it is estimated that such sprays will be exposed to a dose of about $3 \times 10^8$ roentgens accumulated over a period of several weeks at a temperature during this period which can vary between room temperature and a temperature of about 150° C. It is therefore clear that any solution proposed for clean-up of iodine in molecular as well as organic form must have sufficient radiolytic and thermal stability to function effectively under a wide and varying set of conditions. The basic thiosulfate solution has been found to be partially effective for removing organic iodides, but it suffers from extensive radiolytic damage at radiation dosages encountered in typical nuclear excursions.

It is therefore the principal object of this invention to provide a radiation and chemically stable solution which can effectively remove atomic, molecular, as well as organic iodine from gaseous effluents of the type described.

Another object is to provide an improved base-borate solution having enhanced affinity for sorbing organic iodine, principally as methyl iodide.

SUMMARY OF THE INVENTION

The present invention is predicated on the discovery that certain chemical additives to a basic borate solution result in a final solution which can be used effectively as a spray or scrub solution to remove and retain lower alkyl iodides, as well as molecular iodide, from gaseous effluents in contact therewith. The components of the improved class of solutions are:
(a) An aqueous solution adjusted to a pH in the range 9 to 10 with an alkali metal hydroxide such as potassium hydroxide or sodium hydroxide, said solution containing
(b) Up to .3 percent boron, by weight of the total mixture, as borate,
(c) A reducing agent for molecular or atomic iodine selected from the group consisting of sodium thiosulfate and formaldehyde, and
(d) A water-soluble cationic polyelectrolyte having a molecular weight in the range 450 to 100,000, formed by the polymerization of ethylenimine, hereinafter referred to as polyethylenimine or as PEI.

Analysis of the polymeric polyethylenimine molecule has shown it to contain primary, secondary, as well as tertiary nitrogens, which makes the polymer uniquely capable of reacting in a base-catalyzed solution to perform exhaustive methylation reactions as well as quaternization reactions with lower alkyl iodides such as methyl iodide.

An enhanced measure of iodine retention beyond that obtainable by the use of the base-borate solution containing components (a)–(d) mentioned above involves the addition of an effective quantity of a free radical getter selected from the group consisting of nitric oxide, NO; nitrite ion, $NO^-_2$; nitrogen dioxide, $NO_2$; nitrous oxide, $N_2O$; and inorganic compounds that react with hydrated electrons as defined in "The Reactions of Hydrated Electrons With Inorganic Compounds" by Michael Anbar, The Chemical Society Quarterly Reviews, Vol. 22, No. 4, 1968, pp. 579–598, to the solution containing components (a)–(d). inclusive. The addition of the free radical getter has been found to improve the efficiency of iodine removal. The effectiveness of the free radical getter is based on the theory that the free radical getter serves to eliminate or reduce recombination reactions between iodine and the free radical, thus reducing or eliminating the tendency of activated iodine species to recombine to form $CH_3I$. In any event, the free radical getter appears to enhance irreversibility of the physical and chemical reactions of the iodine in the improved base-borate solutions.

EXAMPLE I

The effect of the several additives on the capacity of the base-borate solution to retain methyl iodide was determined by performing a series of bubbler tests using an atmosphere containing radioactively tagged methyl iodide as the sole source of iodine in accordance with the following general procedure: Air containing approximately $5 \times 10^{-7}$ moles of methyl iodide per liter, tagged with iodine-131 tracer, was admitted to the bottom of a column through a porous glass disk which produced fine bubbles into the solution to be tested. After passing through a 1½-inch-diameter, 28-inch-deep column of liquid, the effluent gas was passed through two activated charcoal beds in series to collect any iodine-131 not retained by the solution. The column was operated at a temperature in the range 25–70° C. Air containing the methyl iodide was bubbled through each test solution for a period of 1–2 hours, after which clean air containing no methyliodide was bubbled through for a period of about 16 hours to test the retentive quality of the solution. The flow rate for both the iodine-contaminated air and the subsequent clean air purge was maintained at a rate of 20 mililiters per minute.

All of the test solutions were formulated by introducing the selective additive to an aqueous solution containing 0.3 weight percent boron and then adjusting the pH to 9.0 with sodium hydroxide. The effectiveness of each test solution was determined by counting the activity on the charcoal beds and the activity in an aliquot of the solution. The amount of iodine activity retained by the solution was computed for comparison of the additives. A summary of the results obtained by testing a wide variety of additives to the base-borate solution is found in Table I below. In the table, the molecular weight of polyethylenimine, PEI, was 60,000.

TABLE I

The Effect of Additives on the Efficiency of $CH_3I$ Removal

| Run No. | Additive | Concentration (moles/liter)[1] | Solution temperature (°C) | Iodine retained in solution, percent |
|---|---|---|---|---|
| Single additive |||||
| 1 | None | | 25 | 0 |
| 2 | PEI | .00001 | 25 | 1.5 |
| 3 | PEI | .0001 | 25 | 11.4 |
| 4 | PEI | .0003 | 25 | 28 |
| 5 | PEI | .0003 | 25 | 23 |
| 6 | PEI | .0003 | 50 | 78 |
| 7 | PEI | .0003 | 70 | 98 |
| 8 | PEI | .001 | 25 | 56 |
| 9 | $Na_2S_2O_3$ | .0001 | 25 | 2.0 |
| 10 | $Na_2S_2O_3$ | .001 | 25 | 13.6 |
| 11 | $Na_2S_2O_3$ | .001 | 70 | 79 |
| 12 | $Na_2S_2O_3$ | .01 | 25 | 59 |
| 13 | $Na_2S_2O_3$ | .01 | 25 | 62 |
| 14 | $Na_2S_2O_3$ | .01 | 25 | 64 |
| Two additives |||||
| 15 | $Na_2S_2O_3$ / PEI | .001 / .0001 | 25 | 29 |
| 16 | $Na_2S_2O_3$ / PEI | .01 / .0001 | 25 | 74 |
| 17 | $Na_2S_2O_3$ / PEI | .0001 / .0001 | 25 | 14 |
| 18 | HCHO / PEI | ≈0.1[2] / .000001 | 25 | 0.6 |
| 19 | HCHO / PEI | ≈0.1[2] / .0001 | 25 | 24 |
| 20 | HCHO / PEI | ≈0.1[2] / .001 | 25 | 60 |
| 21 | HCHO / PEI | ≈0.1[2] / .0003 | 25 | 52 |
| 22 | HCHO / PEI | ≈0.25[2] / .0003 | 25 | 67 |
| 23 | HCHO / PEI | ≈1.0[2] / .0003 | 25 | 82 |
| 24 | HCHO / [3] | ≈0.2[2] / .03 | 25 | 57 |

[1] Except as otherwise indicated.
[2] Percent.
[3] Diethylene triamine.

The results of Table I indicate that polyethylenimine is acting, at least additively, with the reducing agent, sodium thiosulfate or formaldehyde, in the base-borate system. A striking improvement in the efficiency of methyl iodide retention is shown with formaldehyde amounting to a synergistic effect since formaldehyde alone, at concentrations running from 0.1 percent to 1 percent (by weight of total solution), in the base-borate system have practically no affinity for methyl iodide. Our experience has shown that the combination of the selected reducing agent and polyethylenimine is compatible in the base-borate solvent and performs, at least additively, to remove the methyl iodide. This point is particularly noteworthy since many candidate materials suggested for methyl iodide removal appear to be effective when tested alone in water, but fail completely when combined with the base-borate system. For example, tributylphosphine oxide as a single additive has demonstrated practically no affinity when tested in the base-borate system, but has a fairly high affinity when tested alone in water, i.e., in the absence of borate ion.

EXAMPLE II

This example is designed to test the effect of the temperature of individual additives, polyethylenimine and sodium thiosulfate, to a base-borate solution. In one case to a base-borate solution a $10^{-3}$ molar sodium thiosulfate solution was added and in a second case the base-borate solution was adjusted to a concentration of $3 \times 10^{-4}$ molar in polyethylenimine (molecular weight of 60,000). The effect of temperature on the iodine retentivity of the solutions is shown in Table II below.

TABLE II

| T, °C.: | Percent I retained |
|---|---|
| $3 \times 10^{-4}$ PEI: | |
| 30 | 35 |
| 40 | 58 |
| 60 | 88 |
| 70 | 98 |
| $10^{-3}$ $Na_2S_2O_3$: | |
| 30 | 18 |
| 40 | 33 |
| 60 | 60 |
| 70 | 78 |

It will be noted that a temperature elevation increases the efficiency of methyl iodide removal for the polyethylenimine as well as the sodium thiosulfate solution. This, taken in combination with the data provided in Table I, shows that the effect of temperature on the combination of the two additives would provide a significantly high reduction in methyl iodide with increasing temperature. The same trend will be true for combinations of polyethylenimine and formaldehyde.

EXAMPLE III

While the degree of methyl iodide retention of a given the mass transfer and distribution coefficients for several additive systems known to function as methyl iodide scavengers and a system representative of the improved solutions within the scope of this invention. In this study, base-borate solution can be determined by bubbling tests, such data do not necessarily provide an accurate measure of the performance of the same solution as a spray. In a bubbler experiment there is a small bubble of gas in contact with a large volume of liquid, whereas in sprays the liquid drop is surrounded by a large volume of gas. In such circumstances, the pertinent variables which determine the efficiency of a given spray to remove methyl iodide from its contacting atmosphere is measured by its mass transfer coefficient, which is a measure of the speed of movement of the methyl iodide into a solution spray droplet, and the distribution coefficient, which is the ratio of methyl iodide in or on the droplet over the amount of methyl iodide in the gas. Accordingly, wind-tunnel, single-drop studies were conducted to determine and compare single drops of a solution were suspended in an atmosphere containing a specified quantity of methyl iodide in contact with the compositions shown in Table III.

TABLE III

Comparison of $CH_3I$ Mass Transfer ($v_t$) and Distribution ($K_d$) Coefficients for Representative Additive Systems at Approximately 25° C.

| Solution composition | $v_t$ (cm./sec.) | $K_d$ |
|---|---|---|
| 4 wt. percent tetrapentamine | $4.3 \times 10^{-2}$ | 4.25 |
| 1 wt. percent $Na_2S_2O_3$ + 0.3 wt. percent B (pH 9) with $1.2 \times 10^{-5}$ M Dow PEI 1000 | $15.0 \times 10^{-2}$ | 55 |
| 1 wt. percent $(NH_4)_2S$ | $4.22 \times 10^{-2}$ | 8.5 |
| 0.5 wt. percent formaldehyde | $2.95 \times 10^{-2}$ | ~3.0 |
| 1 wt. percent $Na_2S_2O_3$ at pH 9 | ~$2 \times 10^{-2}$ | ~3.5 |

The mass transfer coefficients and the distribution coefficients were calculated and are shown in Table III, from which it will be seen that the combination of polyethylenimine with sodium thiosulfate clearly gives the highest distribution coefficient combined with the largest mass transfer coefficient of any of the spray-droplet systems tested. Prior to this invention it was thought that ammonium sulfide was one of the most efficient scavengers known for methyl iodide removal in spray systems. Yet the data clearly show that the distribution coefficient of base-borate solutions containing polyethylenimine and sodium thiosulfate are more than six times greater than ammonium sulfide and that the mass transfer coefficient is more than three times larger.

EXAMPLE IV

In the previous examples we have shown a chemically compatible base-borate system containing a combination of two additives which function, at least additively if not synergistically, to remove methyl iodide from a gaseous atmosphere. It has been shown further that the system operates efficiently either as a bubbler or as a spray. This example illustrates a third additive which can be used in combination with polyethylenimine and the selected reducing agent to even further increase the efficiency of methyl iodide retention.

According to our theory behind this increased measure of improvement, it is thought that the iodine which is sorbed by the bubbler solution or by the spray droplet may yet undergo even further chemical reaction with free radicals which are inevitably present in a highly activated chemical system under radiation. It is then theorized that there is at least some measure of probability that the sorbed iodine could recombine with these free radicals and escape back into the gaseous phase. It is therefore concluded that, if such a recombination could be prevented or reduced, an increased measure of methyl iodide retention could be effected. This example illustrates the efficacy of this proposed mechanism.

Air containing methyl iodide was bubbled through a base-borate solution containing $10^{-3}$ molar sodium thiosulfate and 0.6 percent polyethylenimine (based on the weight of total mixture) for thirty minutes at 25° C. This resulted in a methyl iodide removal efficiency of about 29 percent. The same tests were repeated using, in addition, a trace amount of the order of $10^{-8}$ molar nitric oxide, an amount which is substantially below the maximum solubility of this reagent in the base-borate solution. At a temperature of 25° C. the methyl iodide removal efficiency was increased to 48 percent. When the solution was heated to 50° C., the nitric oxide addition resulted in an increase in methyl iodide removal of 78 percent.

What is claimed is:

1. A reactor safety spray solution for removing iodine from iodine-containing gases in contact therewith comprising:

(a) an aqueous solution adjusted to a pH in the range 9 to 10 with an alkali metal hydroxide such as potassium hydroxide or sodium hydroxide, said solution containing (b) up to .3 percent boron, by weight of the total mixture, as borate, (c) a reducing agent for molecular or atomic iodine selected from the group consisting of sodium thiosulfate and formaldehyde, and (d) a water-soluble cationic polyelectrolyte having a molecular weight in the range 450 to 100,000, formed by the polymerization of ethylenimine.

2. The solution of claim 1 which contains an effective concentration of a free radical getter selected from the group consisting of NO, $NO_2^-$, $NO_2$, and $N_2O$.

References Cited

UNITED STATES PATENTS

| | | | |
|---|---|---|---|
| 3,018,159 | 1/1962 | Silverman | 23—216 |
| 3,338,665 | 8/1967 | Silverman | 23—2 |

OTHER REFERENCES

Chemical Abstracts, vol. 59, 1963, 15846 f.

RICHARD D. LOVERING, Primary Examiner
I. GLUCK, Assistant Examiner

U.S. Cl. X.R.

23—2, 309; 176—58; 252—184